May 15, 1934. S. B. WELCOME ET AL 1,958,599
ORIFICE FITTING
Filed Jan. 30, 1929    2 Sheets-Sheet 1
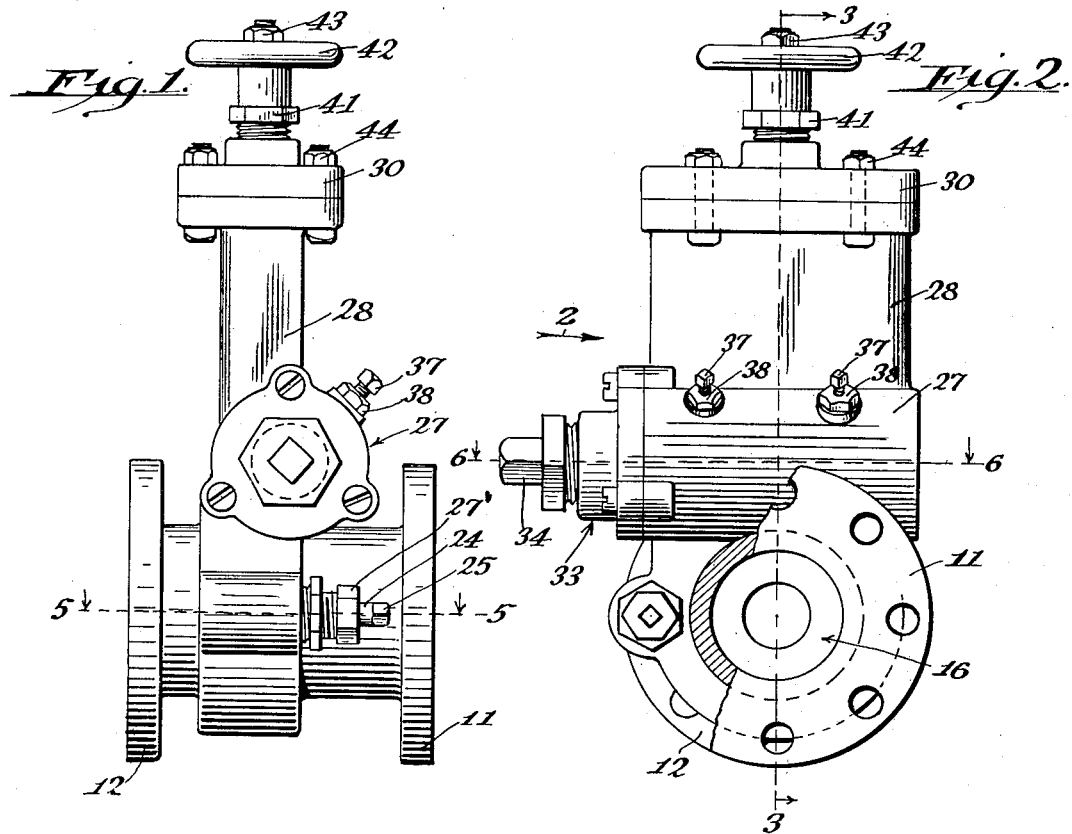
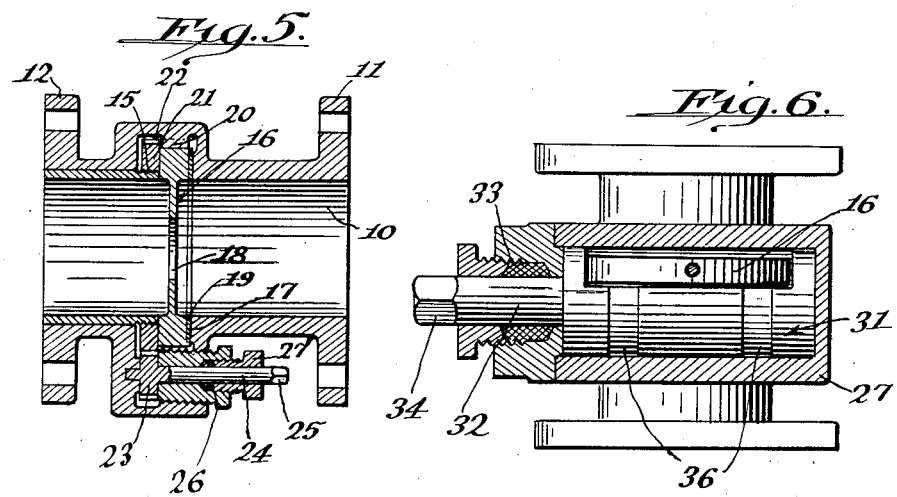
Inventors
S. B. Welcome
O. W. Muff
by Hazard and Miller
Attorneys May 15, 1934.　　S. B. WELCOME ET AL　　1,958,599
ORIFICE FITTING
Filed Jan. 30, 1929　　2 Sheets-Sheet 2

Inventors
S. B. Welcome
O. W. Muff
by Hazard and Miller
Attorneys

Patented May 15, 1934

1,958,599

UNITED STATES PATENT OFFICE 1,958,599

ORIFICE FITTING

Solon Byron Welcome and Oliver William Muff, Los Angeles, Calif., assignors to Commercial Iron Works, Los Angeles, Calif., a corporation of California Application January 30, 1929, Serial No. 336,204

8 Claims. (Cl. 137—75)

This invention relates to improvements in devices commonly known as orifice fittings.

An object of the invention is to provide an improved orifice fitting adapted to be incorporated in a pipe line conveying a fluid such as gas which will removably position an orifice plate in the pipe line so that the gas flowing therethrough will be caused to flow through the orifice which is of a predetermined size thus enabling the quantity of gas flowing through the pipe line to be measured. In devices of this character it is highly important that the orifice plate form a tight joint with the body of the orifice fitting so that no gas can escape around the orifice plate, preventing accurate measurement. It is therefore one object of the invention to provide an improved means for causing the orifice plate when in position to form a tight joint with the body of the orifice fitting so that all of the gas flowing through the pipe line will be caused to pass through the orifice in the orifice plate.

It is another object of the invention to provide a mechanism for tightening the orifice plate against the body of the orifice fitting which is operable by a unitary member which is conveniently and accessibly located on the exterior of the body.

In orifice fittings of this character it is also desirable to be able to remove the orifice plate without stopping the flow of fluid through the pipe line so that the orifice plate having an orifice of one size may have another orifice plate with a differently sized orifice substituted therefor. It is an object of this invention to provide a valve construction which controls the passage between a bore through the valve body through which the gas is flowing and a lateral accessible chamber, which valve is so constructed that when it is in closed position it forms an exceptionally tight closure preventing any escape of gas from the bore into the chamber while the chamber is being opened and the orifice plate is being removed therefrom.

Orifice fittings having a removable and replaceable orifice plate frequently have the orifice become stuck or frozen in the body so that it is difficult to remove the orifice plate for purposes of replacement. This sticking is due to sediment in the gas or fluid settling about the orifice plate and also is due to the pressure applied to the orifice plate to cause it to form a tight joint with the body. It is another object of this invention to provide a mechanically operable means for applying tension of considerable magnitude to the orifice plate so that when it is desired to remove and replace the orifice plate it can be freed from the body quite easily.

With the foregoing and other objects in view which will be made manifest in the following detailed description and specifically pointed out in the appended claims reference is had to the accompanying drawings for an illustrative embodiment of the invention wherein:

Fig. 1 is a view in side elevation of the improved orifice fitting.

Fig. 2 is a view in end elevation of the fitting as viewed from the right of Fig. 1.

Fig. 5 is a horizontal section taken substantially upon the line 5—5 upon Fig. 1.

Fig. 6 is a horizontal section taken substantially upon the line 6—6 upon Fig. 2.

Figure 3:
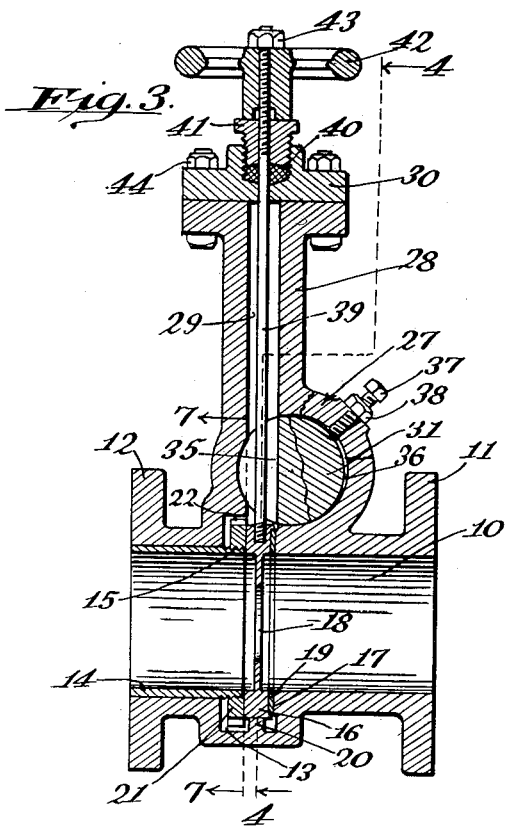
Fig. 3 is a vertical section through the orifice fitting taken substantially upon the line 3—3 upon Fig. 2.

Referring to the accompanying drawings wherein similar reference characters designate similar parts throughout the improved orifice fitting comprises a body having a bore 10 formed therein and which has flanges 11 and 12 adjacent its ends providing for attachment in a pipe line conveying a fluid. The bore 10 is transversely divided, the division being apparent by a groove or recess 13 formed on the interior of the body. One end or the bore 10 is slightly enlarged to receive a section of tubing or the like indicated at 14 constituting a liner. This tubing or liner has its inner end extending into the groove or recess and externally threaded as indicated at 15. The part of the groove or recess 13 which is not occupied by the end of the tubing 14 is adapted to receive a circular orifice plate indicated at 16 and the body of the fitting opposite the tubing 14 is so formed as to provide an annular seat 17 for the orifice plate. The orifice plate has its center made relatively thin and has formed therein an orifice or aperture 18 which is of a predetermined size. The face of the orifice plate opposite the tubing 14 is grooved to receive packing ring 19 adapted to be compressed against the seat 17. On the interior of the body and in the groove or recess 13 there are formed a plurality of bosses 20 which have their outer surfaces carefully machined to constitute abutments for the periphery of the orifice plate. These abutments are so formed that when the periphery of the orifice plate is engaging them the orifice 18 will be positioned in the exact center of the bore 10 which is essential in obtaining accurate measurements of the quantity of gas flowing through the bore 10.

Figure 4:
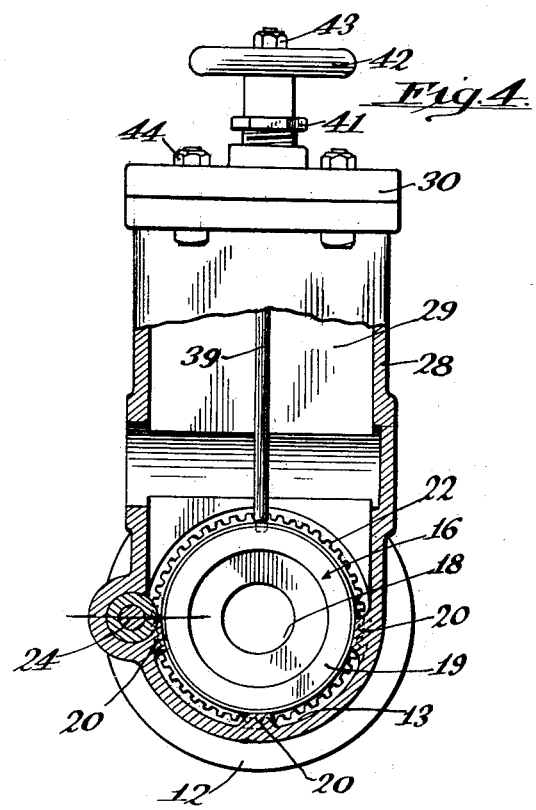
Fig. 4 is a vertical section taken substantially upon the line 4—4 upon Fig. 3.

As previously explained it is highly essential that a tight joint be formed between the orifice plate 16 and the body of the fitting so that no gas can escape around the orifice plate. To this end an annular member 21 is threadedly mounted on the threaded end 15 of the tubing 14 and disposed within the recess or groove 13. This annular member has gear teeth 22 formed on its periphery which mesh with a pinion 23 rotatably mounted within the housing by a shaft 24 having a squared end 25 to which a wrench may be applied. This shaft, as clearly shown in Figs. 2, 4 and 5 is located on the side of the body so as to be readily accessible. A stuffing box indicated at 26 wherein packing is compressed by a gland 27' surrounds the shaft 24 to prevent the escape of gas. On rotation of the shaft 24 by means of a wrench the pinion 22 will be rotated, rotating the annular member 21 and causing it to screw on the tubing 14 into engagement with the orifice plate 16. The threads 15 are preferably given a fairly steep pitch and may be plural threads so that only a small degree of turning of the shaft 24 is required to cause the annular member 21 to screw into engagement with the orifice plate. When the annular member 21 engages the orifice plate it applies an annulus of pressure thereto, forcing the orifice plate with its packing ring 19 into engagement with the seat 17, thus forming a tight joint between the orifice plate and the body. By this construction it will be appreciated that a unitary member, namely the shaft 24 tightens the orifice plate against the body and causes pressure to be equally applied around the orifice plate so that there is no danger of warping or otherwise deforming the orifice plate.

On the top of the body there is formed a valve housing 27 with which the groove or recess 13 constituting the division of the bore 10 communicates. On top of the valve housing 27 there is formed a lateral extension on the body indicated at 28 which provides a laterally accessible chamber 29 into which the orifice plate 16 may be moved. The top of this extension is provided with a cap 30 which provides a closure for the top of the chamber 29.

Within the valve housing 27 there is a valve which comprises a cylindrical body 31 which is rotatable within the housing, rotation being accomplished by the stem 32 which extends out of the housing at one end, through a stuffing box 33 and which is provided with a squared end 34 for the application of a wrench. One side of the body 31 is removed as indicated at 35 so that when the body is in the position shown in Fig. 3 the orifice plate 16 can be moved through the valve housing 27, past the valve 31 to the chamber 29. On rotating the valve body 31 from the position shown in Fig. 3 to the position shown in Fig. 8 communication between the bore 10 and the chamber 29 is closed. It is important that the closure effected between the bore 10 and the chamber 29 be as tight as possible to prevent the escape of gas from the bore 10 through the chamber 29. To accomplish this part of the cylindrical surface on the body 31 is provided with one or more grooves 36, the bottom surfaces of which are eccentric with respect to the center of the valve body 31 as clearly shown in Figs. 3 and 8. Bronze screws 37 or the like, are mounted in the top of the valve housing 27 opposite the entrance thereto from the bore 10. These screws are locked in adjusted positions by means of jamb nuts 38. Their ends extend into the housing 27 and into the grooves 36.

Figure 8:
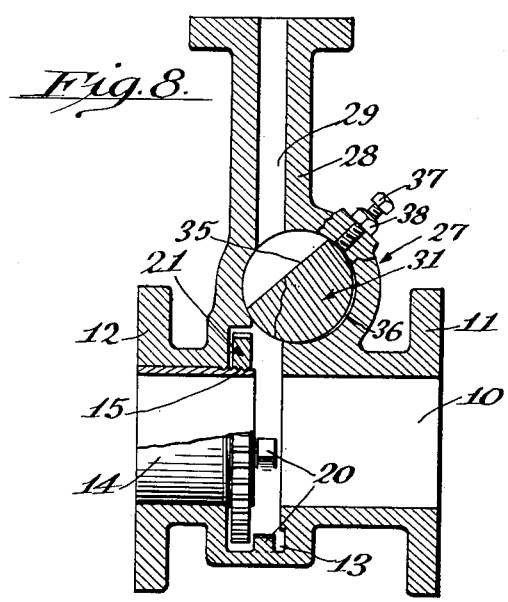
Fig. 8 is a vertical section similar to Fig. 3 illustrating the orifice fitting with the parts in that position after the orifice has been removed therefrom for purposes of replacement.
Figure 7:
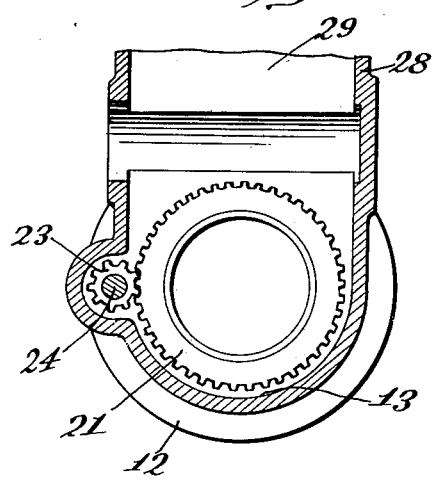
Fig. 7 is a partial view in vertical section taken upon the line 7—7 upon Fig. 3.

Upon rotating the valve body 31 from the open position shown in Fig. 3 to the position shown in Fig. 8 the initial movement is free and easy as the ends of the screws 37 do not engage the bottoms of the grooves 36. However, as the valve body 31 approaches its closed position the ends of the screws 37 will be engaged by the bottoms of the grooves 36 and because of the eccentric nature of the bottoms of the grooves the valve body 31 will be forced tightly against the entrance to the valve housing 27 from the bore 10. This tight jambing action causes the valve body 31 to close off the bore 10 from the chamber 29 very tightly, effectively preventing all escape of gas from the bore 10.

A positioning rod 39 has its lower end threaded into the orifice plate 16 and when the orifice plate 16 is in applied position it extends upwardly through the valve housing 27 through the removed side of the valve body 31, through the chamber 29 and through the cap 30. A stuffing box is provided on the cap 30 wherein packing 40 is compressed by a gland 41 to prevent the escape of gas. The upper end of the positioning rod has a small hand wheel 42 threadedly mounted thereon which rests on top of the gland 41. The upper end of the positioning rod 39 slidably extends through gland 41. A nut 43 is threaded onto the top of the positioning rod above the hand wheel 42 and is preferably pinned in position thereon. When it is desired to remove the orifice plate 16 the shaft 24 is rotated to back off the annular member 21 from the orifice plate. However, it frequently occurs that it is still difficult to loosen the orifice plate because it has become stuck or frozen in the body. In order to facilitate loosening of the orifice plate the hand wheel 42 is rotated, screwing down on the positioning rod 39 and causing tension of considerable magnitude to be transmitted by the positioning rod to the orifice plate which is sufficient to break the orifice plate loose from the body. The positioning rod can then be grasped and lifted bodily causing it to lift the orifice plate 16 through the valve housing 27 into the chamber. When the orifice plate is in the chamber the valve 31 is rotated by the stem 32 closing off the bore 10 from the chamber and the cap 30 can be removed after removing the cap screws 44. When the cap is thus removed the positioning rod 39 and the orifice plate 16 are removed with it, leaving the orifice fitting in the position shown in Fig. 8 and allowing the gas to continue to flow through the pipe line while the orifice plate 16 is being replaced.

From the above described construction it will be appreciated that an improved orifice fitting is provided which has a novel and advantageous construction for causing the orifice plate to form a tight joint with the body. Also a novel and advantageous valve construction is provided which will tightly close off the bore 10 from the chamber 29 while the orifice plate is being removed from the chamber. The improved orifice fitting also provides a readily available mechanism for applying tension to the positioning rod 39 which will insure easy removal of the orifice plate from the groove or recess 13 in the event that the orifice plate has become stuck or frozen therein.

Various changes may be made in the details of construction without departing from the spirit or scope of the invention as defined by the appended claims.

We claim:

1. An orifice fitting comprising a body having a transversely bisected bore therethrough, a laterally accessible chamber, a valve chamber between the laterally accessible chamber and the bore, a port establishing communication between the valve chamber and the laterally accessible chamber, a second port establishing communication between the valve chamber and the bore, said ports being arranged on the same side of a diameter through the valve, a rotary valve in the valve chamber having a side removed and adapted to open and close the second port, said valve presenting an eccentric surface, and means mounted upon the body engageable by the eccentric surface to force the valve toward the second port when in closed position.

2. An orifice fitting comprising a body having a transversely bisected bore therethrough, a laterally accessible chamber, a valve chamber between the laterally accessible chamber and the bore, a port establishing communication between the valve chamber and the laterally accessible chamber, a second port establishing communication between the valve chamber and the bore, said ports being arranged on the same side of a diameter through the valve, a rotary valve in the valve chamber having a side removed and adapted to open and close the second port, and means mounted upon the body adapted to engage the valve and force it against the second port when in closed position.

3. An orifice fitting comprising a body having a transversely divided bore and a laterally accessible chamber, an orifice plate movable from the chamber into the bore, a threaded liner in the bore, an annular member threaded onto the liner, and means for rotating said annular member so as to cause it to screw upon the liner and engage the orifice plate and force it laterally against one side of the division.

4. An orifice fitting comprising a body having a transversely divided bore and a laterally accessible chamber, an orifice plate movable from the chamber into the bore, an externally threaded liner in the bore, an annular member threaded onto the liner, and means for rotating the annular member causing it to screw upon the liner and engage the orifice plate and force it laterally against a side of the division.

5. An orifice fitting comprising a body having a transversely divided bore and a laterally accessible chamber, an orifice plate movable from the chamber into the bore, positioning means operable through the chamber to move the orifice plate from the chamber into the bore, means for closing off the chamber from the bore, a threaded liner in the bore, an annular member threaded upon the liner, and means for rotating said annular member so as to cause it to screw upon the liner and engage the orifice plate and force it laterally against one side of the division.

6. An orifice fitting comprising a body having a transversely divided bore and a laterally accessible chamber, an orifice plate movable from the chamber into the bore, positioning means operable through the chamber to move the orifice plate from the chamber into the bore, means for closing off the chamber from the bore, an externally threaded liner in the bore, an annular member threaded onto the liner, and means for rotating the annular member causing it to screw upon the liner, engage the orifice plate and force it laterally against a side of the division.

7. An orifice fitting comprising a body having a bore therethrough and a lateral chamber, the bore being divided opposite the chamber, an orifice plate removably positioned in the division, means for moving it into the chamber or from the chamber into the bore, means for closing off the chamber from the bore, said bore on one side of the division being enlarged, a liner in the enlarged portion of the bore having an interior diameter substantially the same as the diameter of the bore on the opposite side of the division, an annular member movable on the liner adjacent the division adapted to be caused to engage the orifice plate and clamp it against the side of the division, and means for moving the annular member.

8. An orifice fitting comprising a body having a bore therethrough and a lateral chamber, the bore being divided opposite the chamber, an orifice plate removably positioned in the division, means for moving it into the chamber or from the chamber into the bore, means for closing off the chamber from the bore, said bore on one side of the division being enlarged, a liner in the enlarged portion of the bore having an interior diameter substantially the same as the diameter of the bore on the opposite side of the division, an annular member threaded onto the exterior of the liner adapted to be screwed into engagement with the orifice plate to clamp it against the side of the division, and means operable from the exterior of the body for rotating the annular member.

SOLON BYRON WELCOME.
OLIVER WILLIAM MUFF.